HEAT SENSITIVE COATING AROMATIC AMINES INCLUDING DOUBLE COMPOUNDS WITH METAL HALIDES AND NITROSOAMINES IN A RESIN BINDER

TRANSPARENT BASE SHEET

BASE SHEET
HEAT SENSITIVE COATING
ORIGINAL

ORIGINAL
HEAT SENSITIVE COATING
BASE SHEET

HEATED MEMBER
HEAT SENSITIVE COATING
BASE SHEET

INVENTOR
WILHELM SAHLER
BY J. Russell Juten
ATTORNEY

United States Patent Office 3,097,297
Patented July 9, 1963

3,097,297
HEAT SENSITIVE REPRODUCTION MATERIAL
Wilhelm Sahler, Wiesbaden-Biebrich, Germany, assignor, by mesne assignments, to Kalle Aktiengesellschaft, Wiesbaden-Biebrich, Germany, a corporation of Germany
Filed July 8, 1959, Ser. No. 825,647
Claims priority, application Germany July 15, 1958
11 Claims. (Cl. 250—65)

This invention relates to heat sensitive materials for the reproduction of documents and the like. More particularly, the invention relates to heat sensitive materials of the type coated with a substance which upon exposure to sufficient heat undergoes a chemical change which involves a color change.

Heat sensitive materials for reproduction purposes are in use which are coated with a heat sensitive layer including two reactants which at normal room temperatures do not come into reactive relationship with each other, but upon the application of heat, at least one of the reactants and/or binder fuses so that the reactants do react forming a colored reaction product.

The improved heat sensitive reproduction coatings of the present invention include an aromatic amine, a salt thereof or a double compound thereof with an inorganic metal halide in combination with a nitrosoamine of the general formulas

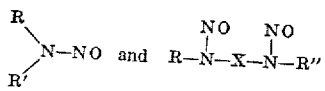

in which R is a carbocyclic aromatic residue or a heterocyclic residue of aromatic nature or a substitution product of these, R' is an aromatic carbocyclic residue, an aliphatic residue or an araliphatic residue or a substitution product of these, R" is an aromatic carbocyclic residue or an araliphatic residue, and X is a carbocyclic aromatic residue. Alternatively, R and R' may form a heterocyclic ring with the central nitrogen atom.

The aromatic amines for the reproduction coatings of the invention are advantageously used in the form of their salts. All salts which the amines form with an inoragnic or organic acid are suitable. The aromatic amines may be used in the form of double compounds with metal halides; for example, zinc chloride, stannous chloride, bismuth trichloride and antimony trichloride. When these double compounds of the amines are used in general higher temperatures are required before the colored compound is formed from the reaction with the nitrosamine present in the coating. The colored compounds resulting from the use of the free amines usually have less intensive coloration.

The nitrosamines used according to the invention are stable at normal temperatures. They are substantially colorless to yellow. As nitrosamines to be used in accordance with the present invention there may be mentioned the following:

Diphenyl-nitrosamine, phenyl-benzyl-nitrosamine, phenyl-2-naphthyl-nitrosamine, o-nitro-diphenyl-nitrosamine, 3-hydroxy-diphenyl-nitrosamine, sodium salt of diphenyl-nitrosamine-4-sulfonic acid, N-nitroso-carbazole, N-pyridyl-phenyl-nitrosamine, ethyl-2-naphthyl-nitrosamine, α-pyridyl-phenyl-nitrosamine, N,N'-dinitroso-N,N'-diphenyl-p-phenylenediamine, 4-nitro-diphenyl-nitrosamine, 4-methyl-diphenyl-nitrosamine, 2,2'-dinaphthyl-nitrosamine, di-α-pyridyl-nitrosamine, di-α-quinolyl-nitrosamine, 2 - (phenyl-nitrosamine)-5-bromo-pyridine, 3-methoxy-diphenyl-nitrosamine, 3-acetoxy-diphenyl-nitrosamine, diphenyl-nitrosamine - 2 - carboxylic acid, 2-hydroxy-diphenyl-nitrosamine, 4-chloro-diphenyl-nitrosamine, 4-methyl-3'-bromo-diphenyl-nitrosamine, 4-hydroxy-diphenyl-nitrosamine, ethyl-1-naphthyl-nitrosamine, N-nitroso-benzanilide, p-tolyl-benzyl-nitrosamine, 4-methoxy-diphenyl-nitrosamine-2'-carboxylic acid, 2-methoxy-diphenyl-nitrosamine-2'-carboxylic acid, 4-methoxy-diphenyl-nitrosamine, N,N'-dinitroso-N-phenyl-N'-benzyl-p-phenylene-diamine, 1-(5-hydroxy-phenyl-nitrosamino) naphthalene, 1-(6-hydroxy-phenyl-nitrosamino)-naphthalene, 2-(2-methoxy-phenyl-nitrosamino)-pyridine, 2-(6-methyl-phenyl-nitrosamino)-pyridine, 2-(phenyl-nitrosamino)-pyrimidine, 3-(phenyl-nitrosamino)-thionaphthene, 2-(phenyl-nitrosamino)-diphenyleneoxide.

The amine salts are, in the pure state, colorless. The finished coatings prepared with these two reaction components are therefore colorless to yellow. Under the action of heat highly colored azo dyestuffs are produced from the nitrosamine and amine components. By varying the nitrosamines and the amines, or amine salts, or amine double compounds, it is possible to produce various colors. The images obtained do not lose their color when stored, nor do they undergo any change in contrast, so that they can be stored for long periods.

Numerous disclosures are to be found in the literature for the preparation of the amines, their salts and their double compounds with inorganic metal halides. The preparation of these compounds can be carried out without any difficulty. The same thing applies to the preparation of the nitrosamines. Generally they are formed as a result of the addition, with cooling in the presence of acid, of sodium nitrite to the corresponding amine dissolved in an organic solvent.

The coating solution for application to the base sheet material is prepared by mixing the nitrosamine and the aromatic amine, or its salt or double compound, in the form of fine suspensions, with a solution of the binder. The mixture is applied to the base sheet material and the coating thus formed is dried. Drying is advantageously carried out at room temperature without heating. The drying process may be speeded up by passing a current of air over the coating. Moderate heating of the coating or of the air may also be considered but it is recommended that temperatures of 35–40° C. be not exceeded.

Suitable binders are resins that are soluble in solvents which do not dissolve the components that form the dyestuffs. The solvents are primarily aliphatic hydrocarbons and to some extent hydrocarbon halides. Examples of resins suitable as binders for the purposes of the invention are: cyclised rubber such as that marketed by Chemische Werke Albert, Wiesbaden-Biebrich, Western Germany under the registered trademark "Alpex" 450J, maleic acid resins, such as the KM or KPM resin of the Badische Anilin-und Soda-Fabrik, Ludwigshafen, Western Germany, or modified colophony esters, such as in the product marketed by the Badische Anilin- und Soda-Fabrik under the registered trademark "Laropal" B.

Examples of suitable base sheet materials for the reproduction coatings of the present invention are glass, paper, transparent paper, tracing paper, tracing cloth, cellulose hydrate foils, transparent plastic films, e.g. polyvinyl chloride film, cellulose acetate film and polyethylene terephthalate film. The use of a transparent base material has advantages which will be apparent from what follows:

A procedure by which images can be produced by heat-action from the reproduction materials of the invention is the following:

(1) A transparent material provided with the heat sensitive coating is placed with its coated side against the original to be copied. The original may have printing or writing on one or both sides. Radiant heat is applied to the back of the reproduction paper, for example by means of an infra-red lamp. The more intensive the source of energy the sharper is the image and the shorter the radiation time required. In the heat sensitive coating there is formed a direct, deeply colored mirror-image of the original which can be read correctly from the back, through the transparent support.

(2) Originals with printing or typing on one side only can also be copied by the radiation of heat through the original when the latter is in contact with the heat sensitive reproduction coating and it is immaterial whether the heat sensitive reproduction coating has its back or its front in contact with the master.

The duration of heat action for the production of satisfactory heat images that are sharp and rich in contrast, cannot be generally set forth. It has to be established from case to case. It is dependent on a number of factors such as the kind, strength and distance from the master of the source of energy, the type of support and the composition of the heat sensitive coating.

With the reproduction materials of the invention images can also be prepared by means of a heated stylus or a heated stamp.

The drawing shows sections of the heat sensitive reproduction material and the use thereof.

*Examples*

Figure 1:
FIG. 1 is a fragmentary section of the heat sensitive material showing the transparent base and the heat sensitive coating thereon.
Figure 2:
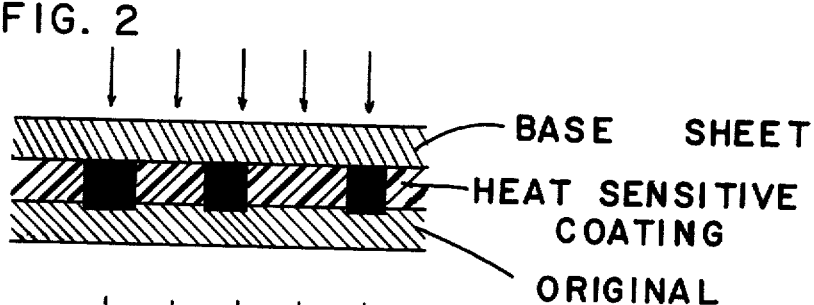
FIG. 2 is a section of the heat sensitive material with the coated side thereon in contact with an original to be copied and showing the heat rays passing through the transparent base to the heat sensitive material and the image areas of the original causing heat to be absorbed on the image areas of the original producing an image by the action of the heat on the heat sensitive material.
Figure 3:
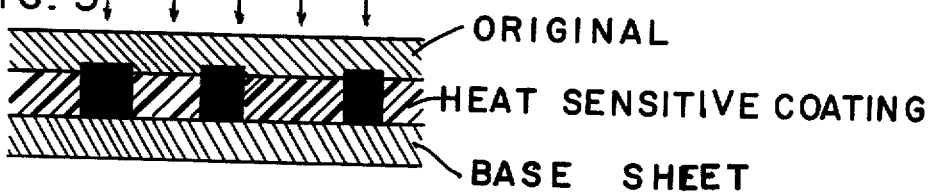
FIG. 3 is a fragmentary section of the heat sensitive material with its coating against the image surface of the original and illustrating the heat rays passing through the original producing a right reading copy as viewed from the back or uncoated side of the heat sensitive material.
Figure 4:
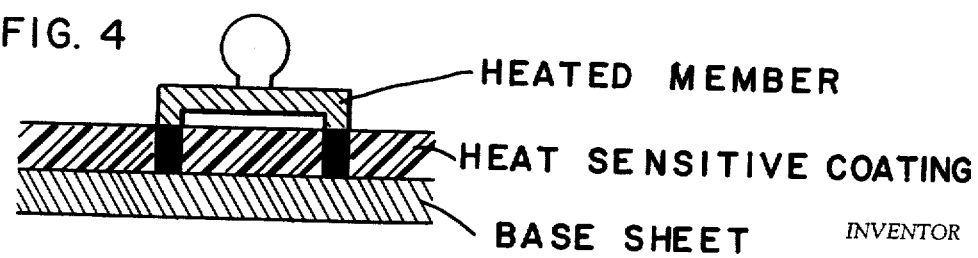
FIG. 4 is a fragmentary sectional view showing a heated member in contact with the heat sensitive coating of the reproduction material illustrating the formation of an image by direct conductive heat from the heated member.

(1) 50 g. of diphenyl-nitrosamine corresponding to Formula 1 and 250 cc. of petroleum-ether (boiling-point range of 60–80° C.) are ground for three days in a ball mill. Simultaneously but in a separate mill 50 g. of p-phenetidine hydrochloride and 250 cc. of petroleum-ether are ground together. Equal quantities by volume of the two suspensions thus obtained are then thoroughly mixed together. This mixture is mixed with an equal volume of a ligroin solution containing 10% of a cyclized rubber such as that marketed by the Chemische Werke Albert, Wiesbaden-Biebrich, under the registered trademark "Alpex" 450J. The combined suspensions are thoroughly mixed. The coating solution thus obtained is applied to transparent paper and dried in moderate heat.

For the production of a heat image the coated transparent paper is placed coated side against the master to be copied, e.g. a printed page, and its back is exposed to the radiation from a powerful infra-red lamp. From the uncoated side the radiation penetrates the heat sensitive reproduction paper, is heavily absorbed by the printed parts of the master and this heat brings about condensation between the diphenylnitrosamine and p-phenetidine in the parts of the heat sensitive coating in contact with the print of the master. A direct mirror image reproduction of the master in olive black is obtained which can be read correctly from the back through the transparent paper.

Diphenylnitrosamine corresponding to Formula 1 is prepared by the slow addition dropwise to the solution of 40 parts by weight of diphenylamine in 200 parts by weight of ethanol, of 30 parts by weight of concentrated hydrochloric acid and then, after the mixture has cooled to 5–10° C. of 35 parts by weight of aqueous sodium nitrite solution containing two parts by weight of solid sodium nitrite to three parts by weight of water with thorough stirring. Afterwards the reaction mixture is thoroughly cooled with an ice/common salt mixture and the diphenyl-nitrosamine formed is precipitated by the addition of water. The diphenylnitrosamine is separated by suction, washed with water, dried, and recrystallized from ligroin. The pale yellow crystalline mass obtained melts at 66—67° C.

(2) The p-phenetidine hydrochloride used in Example 1 is replaced by the addition compound of zinc chloride and p-toluidine and the process is the same as that described in Example 1. The heat images produced are bluish black.

(3) 50 g. of phenyl-benzyl-nitrosamine corresponding to Formula 2 are finely ground in a ball mill with 250 cc. of petroleum ether. The resultant suspension is mixed with a suspension of 50 g. of aminohydroquinone-diethyl-ether hydrochloride, also in 250 cc. of petroleum ether. To this mixture 600 cc. of the 10% solution of cyclized rubber in ligroin described in Example 1 are added and the whole is mixed thoroughly. The substance thus obtained is coated upon cellulose hydrate foil and dried with moderate heat. With this material the copying process described in Example 1 produces violet images.

Phenyl-benzyl-nitrosamine corresponding to Formula 2 is obtained if 91.5 g. of phenyl-benzylamine are dissolved in 500 cc. of glacial acetic acid and the solution of 34.5 g. of sodium nitrite in 60 cc. of water is slowly added thereto dropwise, with cooling to 5–10° C. and thorough stirring. When the reaction is completed, the phenyl-benzyl-nitrosamine is precipitated out completely by the addition of water to the reaction mixture. It is separated by suction, washed with water, dried, and recrystallized from petroleum ether. Nearly colorless crystals with a melting point of 52–53° C. are obtained.

(4) 50 g. of phenyl-2-naphthyl-mitrosamine corresponding to Formula 3 are ground for three days in a ball mill in 250 cc. of nigroin and then mixed with a similarly prepared suspension of 50 g. of o-aminophenol-hydrochloride in 250 cc. of petroleum ether. To this mixture are added 700 cc. of a 10% solution in ligroin of a maleic acid resin such as the KPM resin marketed by the Badische Anilin- und Soda-Fabrik, and the mixture is coated upon transparent paper which is afterwards dried in gentle heat. If this paper is used for the copying process described in Example 1, black violet images are obtained.

Phenyl-2-naphthyl-nitrosamine corresponding to Formula 3 is prepared by the solution in 600 cc. of glacial acetic acid of 110 g. of phenyl-2-naphthylamine and the addition dropwise, with cooling (5–10° C.), of 34.5 g. of sodium nitrite dissolved in 60 cc. of water. The phenyl-2-naphthyl-nitrosamine is precipitated from the reaction mixture by the addition of water and it is washed and dried. It is then recrystallized from a mixture of benzene and petroleum ether in the proportions of 1:3. Colorless crystals with a melting point of 97–98° C. are obtained.

(5) 50 g. of o-nitrodiphenylnitrosamine corresponding to Formula 4 are finely ground in 250 cc. of petroleum ether and mixed with a suspension, likewise formed by thorough grinding, of 50 g. of 1-naphthylamine-hydrochloride in 250 cc. of petroleum ether. To this mixture 500 cc. of a 10% solution in ligroin of a modified colophony ester are added; e.g. the product marketed by the Badisch Anilin- und Soda-Fabrik under the registered trademark "Laropal" B, and the mixture is applied to cellulose acetate foil. The coated cellulose acetate foil is dried in moderate heat. If this coating is used in the copying process described in Example 1, black brown images are produced.

o-Nitrodiphenyl-nitrosamine corresponding to Formula 4 is produced if 100 g. of o-nitrodiphenylamine is dissolved in 500 cc. of glacial acetic acid, the solution cooled to 5–10° C. and a solution of 34.5 g. of sodium nitrite in 60 cc. of water then slowly added dropwise thereto with thorough stirring. The o-nitrodiphenyl-nitrosamine formed precipitates from the reaction mixture on the addition of water. It is separated by suction and then recrystallized from ethanol. Light yellow crystals with a melting point of 99–100° C. are obtained.

(6) 50 g. of 3-hydroxydiphenyl-nitrosamine corresponding to Formula 5 are finely ground to 250 cc. of petroleum ether and mixed thoroughly with a suspension produced by the grinding of 50 g. of aminohydroquinone-diethylether oxalate in 250 cc. of petroleum ether. To this mixture 600 cc. of a 10% solution in ligroin of cyclized rubber, e.g. the product marketed by the Chemische Werke Albert, Wiesbaden-Biebrich, under the registered trademark "Alpex" 450J, are added and the whole is again thoroughly mixed. The mixture thus obtained is coated upon transparent paper and dried in moderate heat. With this heat sensitive paper black violet images are obtained by the copying process described in Example 1.

3-hydroxydiphenyl-nitrosamine corresponding to Formula 5 is obtained if 92.6 g. of 3-hydroxydiphenylamine are dissolved in 300 cc. of glacial acetic acid, this solution is cooled down to 5–10° C. and a solution of 34.5 g. of sodium nitrite in 100 cc. of water is added dropwise with thorough stirring. Ice water is added to the reaction mixture and the 3-hydroxydiphenylnitrosamine is thus precipitated. It is separated by suction, washed with water, dried and recrystallized from benzene in the presence of animal charcoal. Colorless crystals are obtained which decompose with blackening at 110° C.

Instead of the 50 g. of nitrosamine corresponding to Formula 5 mentioned above, 50 g. of ethyl-2-naphthyl-nitrosamine corresponding to Formula 9 may be used if the same procedure as described above is followed. A violet image is then obtained from the reproduction material thus produced. The nitrosamine corresponding to Formula 9 is obtained if 17.1 g. of ethyl-2-naphthylamine are dissolved in 300 cc. of glacial acetic acid and 55 cc. of 2 N aqueous solution of sodium nitrite are slowly added thereto with cooling and stirring. The nitrosamine formed is precipitated from the reaction mixture by the addition of water. It is separated by suction, washed with water and dried. After recrystallization from petroleum ether it forms nearly colorless crystals with a melting point of 48–49° C.

(7) 50 g. of diphenyl-nitrosamine-4-sulphonic acid sodium salt corresponding to Formula 6 are finely ground in 250 cc. of cyclohexane and thoroughly mixed with a suspension produced by the grinding of 50 g. of the salt formed from 2.5-dimethyl-benzene-sulphonic acid and 1-benzoylamino-4-amino-2,5-diethoxy-benzene with 250 cc. of cyclohexane. 600 cc. of a 10% solution in ligroin of cyclized rubber, e.g. the product marketed by the Chemische Werke Albert, Wiesbaden-Biebrich, Western Germany, under the registered trademark "Alpex" 450J, are added to this mixture. The mixture is applied in a thin coating by means of a spray gun to a cellulose acetate film and is dried. If this coated cellulose acetate film is used for the copying process described in Example 1, deep black images are obtained.

Diphenyl-nitrosamine-4-sulphonic acid sodium salt corresponding to Formula 6 is obtained if 150 g. of diphenyl-amine-4-sulphonic acid sodium salt is dissolved in 400 cc. of water and 160 cc. of concentrated hydrochloric acid and a solution of 34.5 g. of sodium nitrite in 100 cc. of water are added dropwise thereto with cooling and stirring. Concentrated common salt solution is added to the reaction mixture to precipitate the diphenyl-nitrosamine-4-sulphonic acid sodium salt. The precipitated reaction product is separated with suction and purified several times by solution in hot water (temperature 40–50° C.) in the presence of animal charcoal and reprecipitation by the addition of a concentrated common salt solution. If the reaction product must be obtained in a completely pure state, it is finally dissolved in methanol and reprecipitated from the solution by addition of ether. The pale yellow product does not decompose until heated to over 300° C.

(8) If, instead of diphenyl-nitrosamine-4-sulphonic acid sodium salt, the same quantity of N-nitroso-carbazole corresponding to Formula 7 is used according to the procedure described in Example 7, a reproduction material is obtained which gives bluish black images when used as described in Example 1.

N-nitrosocarbazole corresponding to Formula 7 is produced from carbazole by a method analogous to that described in Example 3 for the preparation of phenylbenzyl-nitrosamine. N-nitrosocarbazole is yellow in color and melts at 75–76° C.

(9) 50 g. of α-pyridyl-phenyl-nitrosamine corresponding to Formula 8 are finely ground with 250 cc. of cyclohexane and the suspension thus obtained is mixed thoroughly with a suspension obtained by the grinding of 50 g. of the oxalic acid salt of 1-benzoyl-amino-4-amino-2,5-diethoxy-benzene in 250 cc. of petroleum ether. This mixture then has added to it twice its volume of a 10% solution in ligroin of a cyclized rubber, e.g. the product "Alpex" 450J described in detail in the earlier examples, and the combination is again thoroughly mixed. The mixture thus obtained is applied to transparent paper in a thin coating by means of a spray gun and is dried. When this paper is used in the copying process described in Example 1, deep violet images are obtained.

α-Pyridyl-phenyl-nitrosamine corresponding to Formula 8 is prepared from α-pyridyl-phenyl-amine and sodium nitriate. The method is analogous to that described in Example 3 for the preparation of the compound corresponding to Formula 2 (benzylaniline-nitrosamine). After being recrystallized from benzene the α-pyridyl-phenyl-nitrosamine melts at 102° C.

(10) A coating composition is produced by intimately mixing the suspensions A, B, C and D prepared as follows:

A—100 parts by weight of 3 hydroxydiphenyl-nitrosamine corresponding to Formula 5 are finely ground in 500 parts by volume of petroleum ether having a boiling point ranging from 80–110° C.

B—100 parts by weight of 2,6-xylene sulfonic acid 1-benzoyl-amino-2,5-diethoxy-4-aminobenzene and 2.5 parts by weight of 1-benzoylamino-2,5-diethoxy-4-aminobenzene are finely ground in 1000 parts by volume of petroleum ether having a boiling point ranging from 80—110° C.

C—125 parts by weight of zinc oxide are finely ground with a solution of 25 parts by weight of cyclized caoutchouc (Alpex 450J) in 100 parts by volume of petroleum ether having a boiling point ranging from 80 to 110° C. and subsequently there are added 350 parts by volume of petroleum ether (80–110°).

D—2 parts by weight of aluminum stearate (type 30 FD) are dissolved by heating in 400 parts by volume of petroleum ether having a boiling point ranging from 80 to 110° C. After cooling, 100 parts by weight of cyclized caoutchouc (Alpex 450J) are dissolved therein. These suspensions are mixed in the following proportions:

| | Parts by volume |
|---|---|
| A | 100 |
| B | 100 |
| C | 30 |
| D | 75 |

The mixture thus obtained is applied to transparent paper in a thin coating and is then dried at room temperature by means of an air current.

When used in the reproduction process described in Example 1, this heat sensitive paper yields blackish-green images of rich contrast, which turn blackish-blue upon storing due to a further increase in intensity.

(11) A coating composition is prepared by intimately mixing the suspensions A, B$_1$, C and D. Suspensions A, C and D are prepared as described above. Suspension B$_1$ is prepared as follows:

B$_1$—100 parts by weight of p-toluene sulfonic acid 1-benzoyl-amino-2,5-diethoxy-4-aminobenzene and 2,5 parts by weight of 1-benzoylamino-2,5-diethoxy-4-aminobenzene are finely ground in 1000 parts by volume of petroleum ether having a boiling point ranging from 80 to 110° C. These suspensions are mixed in the following proportions:

| | Parts by volume |
|---|---|
| A | 100 |
| B$_1$ | 100 |
| C | 30 |
| D | 75 |

The thus obtained mixture is applied to transparent paper in a thin coating and is dried at room temperature by means of an air current.

When used in the reproduction process described in Example 1, this heat sensitive paper yields blackish-green images, which show good contrast and which after storing for a short time turn blackish-blue due to a further increase in intensity.

(12) A further coating composition is prepared by mixing the components A$_1$, B$_1$, C$_1$ and D$_1$, A$_1$, C$_1$ and D$_1$ being prepared as follows:

A$_1$—50 parts by weight of N,N'-dinitroso-N,N'-diphenyl-p-phenylendiamine are finely ground in 500 parts by volume of petroleum ether having a boiling point ranging from 80 to 110° C.

C$_1$—125 parts by weight of zinc oxide are finely ground with a solution comprising 25 parts by weight of cyclized caoutchouc (Alpex 450J) and 100 parts by volume of petroleum ether having a boiling point ranging from 80–110° and subsequently there are added 350 parts by volume of petroleum ether (80–110° C.).

D$_1$—250 parts by weight of cyclized caoutchouc (Alpex 450J) are dissolved by shaking at room temperature in 1000 parts by volume of petroleum ether having a boiling point ranging from 80–110° C.

The thus obtained suspensions or solutions, respectively are intimately mixed as follows:

| | Parts by volume |
|---|---|
| A$_1$ | 100 |
| B$_1$ | 100 |
| C$_1$ | 30 |
| D$_1$ | 100 |

The mixture thus obtained is applied to transparent paper in a thin coating and is dried at room temperature by means of an air current.

When this heat sensitive paper is used for the reproduction process described in Example 1, dark green images showing good contrast, are obtained.

N,N'-dinitroso-N,N'-diphenyl-p-phenylenediamine corresponding to Formula 10 is prepared by dissolving 26 parts by weight of diphenyl-p-phenylenediamine in a mixture comprising 700 parts by volume of dioxane and 100 parts by volume of glacial acetic acid and then while cooling to a temperature of +5° C. introducing the nitroso group by means of a solution of 14 parts by weight of sodium nitrite in 50 parts by volume of water, as has been repeatedly described before. The product thus obtained is precipitated by carefully diluting the solution with water, separated by suction and washed with a mixture of glacial acetic acid and ethanol (1:1). Having been dried, the product is dissolved in benzene at a temperature of not more than 55° C. and subsequently the product is reprecipitated by the addition of ligroin. Yield: 27 parts by weight, golden yellow leaflets, which decompose slowly at a temperature of 120° C.

(13) A combination of the suspensions described in Examples 10 and 12 yields favorable results.

A coating composition comprising 100 parts by volume of suspension B$_1$
100 parts by volume of suspension D$_1$
50 parts by volume of suspension A
50 parts by volume of suspension A$_1$
30 parts by volume of suspension C is applied to transparent paper in a thin layer and is dried at room temperature. When using the reproduction process described in Example 1, black images are obtained.

Having thus described the invention, what is claimed is:

1. A heat sensitive material for the reproduction of images comprising a base material in sheet form coated with a binder and a heat sensitive layer including a heat sensitive substance selected from the group consisting of aromatic amines, their salts and double compounds with inorganic metal halides, in combination with a nitrosamine corresponding to the general formulas

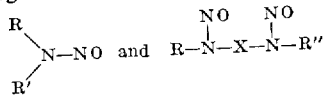

wherein
R is selected from the group consisting of aromatic carbocyclic residues, heterocyclic residues of aromatic nature, and substitution products of these,
R' is selected from the group consisting of aromatic carbocyclic residues, aliphatic residues, araliphatic residues, and substitution products of these,
R" is selected from the group consisting of aromatic carbocyclic residues and araliphatic residues, and
X is a carbocyclic aromatic residue,
and wherein R and R' may join to form a ring.

2. A heat sensitive material for the reproduction of images comprising a transparent base material in sheet form coated with a binder and a heat sensitive layer including a heat sensitive substance selected from the group consisting of aromatic amines, their salts and double compounds with inorganic metal halides, in combination with a nitrosamine corresponding to the general formulas

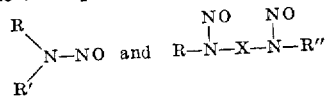

wherein
R is selected from the group consisting of aromatic carbocyclic residues, heterocyclic residues of aromatic nature, and substitution products of these,
R' is selected from the group consisting of aromatic carbocyclic residues, aliphatic residues, araliphatic residues, and substitution products of these,
R" is selected from the group consisting of aromatic carbocyclic residues and araliphatic residues, and
X is an aromatic carbocyclic residue,
and wherein R and R' may join to form a ring.

3. A heat sensitive material for the reproduction of images comprising a base material in sheet form coated with a binder and a heat sensitive layer including diphenylnitrosamine and p-phenetidine hydrochloride.

4. A heat sensitive material for the reproduction of images comprising a base material in sheet form coated with a binder and a heat sensitive layer including phenyl-benzyl-nitrosoamine and aminohydroquinone-diethylether hydrochloride.

5. A heat sensitive material for the reproduction of images comprising a base material in sheet form coated with a binder and a heat sensitive layer including phenyl-2-naphthylnitrosamine and o-aminophenol-hydrochloride.

6. A heat sensitive material for the reproduction of images comprising a base material in sheet form coated with a binder and a heat sensitive layer including o-nitro-diphenylnitrosamine and 1-naphthylamine-hydrochloride.

7. A heat sensitive material for the reproduction of images comprising a base material in sheet form coated with a binder and a heat sensitive layer including 3-hydroxy-dephenyl-nitrosamine and aminohydroquinone-diethyl-ether oxalate.

8. The method of forming a reproduction of an original document comprising the steps of placing a transparent sheet material coated with a binder and a heat sensitive layer including a heat sensitive substance selected from the group consisting of aromatic amines, their salts and double compounds with inorganic metal halides, in combination with a nitrosamine corresponding to the general formulas

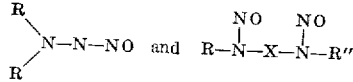

wherein

R is selected from the group consisting of aromatic carbocyclic residues, heterocyclic residues of aromatic nature, and substitution products of these, R' is selected from the group consisting of aromatic carbocyclic residues, aliphatic residues, araliphatic residues, and substitution products of these, R" is selected from the group consisting of aromatic carbocyclic residues and araliphatic residues, and X is an aromatic carbocyclic residue, and wherein R and R' may join to form a ring, with its coated side against an original to be copied and applying radiant heat to the back of said transparent sheet material.

9. The method of forming a reproduction of an original document comprising the steps of placing a base sheet material coated with a binder and a heat sensitive layer including a heat sensitive substance selected from the group consisting of aromatic amines, their salts and double compounds with inorganic metal halides, in combination with a nitrosamine corresponding to the general formulas

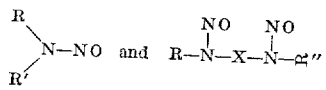

wherein

R is selected from the group consisting of aromatic carbocyclic residues, heterocyclic residues of aromatic nature, and substitution products of these, R' is selected from the group consisting of aromatic carbocyclic residues, aliphatic residues, araliphatic residues, and substitution products of these, R" is selected from the group consisting of aromatic carbocyclic residues and araliphatic residues, and X is an aromatic carbocyclic residue, and wherein R and R' may join to form a ring against an original to be copied having an image on one side only and applying radiant heat to the back of said original.

10. The method of forming an image on a base sheet material coated with a binder and a heat sensitive layer including a heat sensitive substance selected from the group consisting of aromatic amines, their salts and double compounds with inorganic metal halides, in combination with a nitrosamine corresponding to the general formulas

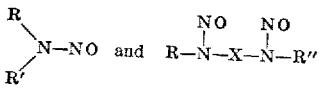

wherein

R is selected from the group consisting of aromatic carbocyclic residues, heterocyclic residues of aromatic nature, and substitution products of these, R' is selected from the group consisting of aromatic carbocyclic residues, aliphatic residues, araliphatic residues, and substitution products of these, R" is selected from the group consisting of aromatic carbocyclic residues and araliphatic residues, and X is an aromatic carbocyclic residue, and wherein R and R' may join to form a ring, comprising the step of bringing a heated member in contact with the coated surface of said sheet material.

11. The method of making a heat sensitive reproduction sheet material comprising forming a mixture of two substances, one of them being selected from the group consisting of aromatic amines, their salts and double compounds with inorganic metal halides, the other being a nitrosamine corresponding to the general formulae

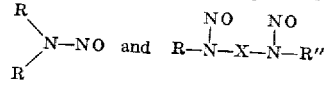

wherein

R is selected from the group consisting of carbocyclic aromatic residues, heterocyclic residues of aromatic nature, and substitution products of these, R' is selected from the group consisting of aromatic carbocyclic residues, aliphatic residues, and araliphatic residues, and substitution products of these, R" is selected from the group consisting of aromatic carbocyclic residues and araliphatic residues, and X is a carbocyclic aromatic residue, and wherein R and R' may join to form a ring, said substances do not react at ordinary temperatures and which do not dissolve in a selected solvent, mixing such substances with the solvent and with a binder which is dissolved in the solvent to maintain a suspension of the heat sensitive substances, and applying the mixture to a base sheet and causing the solvent to evaporate leaving the binder and the heat sensitive substances intermixed and coated on the base material thereby providing a readily useable heat sensitive sheet.

References Cited in the file of this patent

UNITED STATES PATENTS

| | | |
|---|---|---|
| 2,663,654 | Miller et al. | Dec. 22, 1953 |
| 2,808,777 | Roshkind | Oct. 8, 1957 |
| 2,813,043 | Clark | Nov. 12, 1957 |
| 2,859,351 | Clark et al. | Nov. 4, 1958 |
| 2,910,377 | Owen | Oct. 27, 1959 |
| 2,919,349 | Kuhrmeyer et al. | Dec. 29, 1959 |
| 2,950,213 | Streck | Aug. 23, 1960 |
| 2,950,987 | Howard | Aug. 30, 1960 |
| 2,967,784 | Newman | Jan. 10, 1961 |

UNITED STATES PATENT OFFICE
CERTIFICATE OF CORRECTION

Patent No. 3,097,297
July 9, 1963

Wilhelm Sahler

It is hereby certified that error appears in the above numbered patent requiring correction and that the said Letters Patent should read as corrected below.

Column 9, lines 11 to 15, lines 40 to 45, and column 10, lines 27 to 30, the formula, each occurrence, should appear as shown below instead of as in the patent:

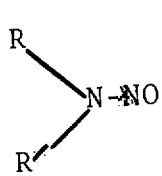   and   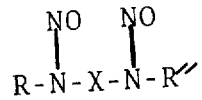

Signed and sealed this 29th day of June 1965.

(SEAL)
Attest:

ERNEST W. SWIDER
Attesting Officer

EDWARD J. BRENNER
Commissioner of Patents